US012798551B2

(12) United States Patent
Wang et al.

(10) Patent No.: US 12,798,551 B2
(45) Date of Patent: Nov. 17, 2026

(54) METHOD AND APPARATUS FOR CONTROLLING GEAR SHIFTING OF HYBRID ELECTRIC VEHICLE, AND STORAGE MEDIUM

(71) Applicant: CHERY AUTOMOBILE CO., LTD., Wuhu (CN)

(72) Inventors: Qinglai Wang, Wuhu (CN); Keguang Qi, Wuhu (CN); Cheng Tao, Wuhu (CN); Deyu Li, Wuhu (CN); Zhenyang Liang, Wuhu (CN); Lijuan Gao, Wuhu (CN)

(73) Assignee: CHERY AUTOMOBILE CO., LTD., Wuhan (CN)

( * ) Notice: Subject to any disclaimer, the term of this patent is extended or adjusted under 35 U.S.C. 154(b) by 0 days.

(21) Appl. No.: 18/874,983

(22) PCT Filed: Sep. 26, 2023

(86) PCT No.: PCT/CN2023/121623
§ 371 (c)(1),
(2) Date: Dec. 13, 2024

(87) PCT Pub. No.: WO2024/074106
PCT Pub. Date: Apr. 11, 2024

(65) Prior Publication Data

US 2025/0360909 A1 Nov. 27, 2025

(30) Foreign Application Priority Data

Oct. 8, 2022 (CN) ........................ 202211230507.7

(51) Int. Cl.
*B60W 20/30* (2016.01)
*B60W 10/02* (2006.01)
(Continued)

(52) U.S. Cl.
CPC .......... *B60W 20/30* (2013.01); *B60W 10/023* (2013.01); *B60W 10/06* (2013.01);
(Continued)

(58) Field of Classification Search
CPC .... B60W 10/023; B60W 10/06; B60W 10/08; B60W 10/11; B60W 20/30;
(Continued)

(56) References Cited

U.S. PATENT DOCUMENTS 9,096,208 B2 * 8/2015 Nefcy .................. B60W 10/02
9,656,657 B2 * 5/2017 Gibson .................. F16D 48/06
(Continued)

FOREIGN PATENT DOCUMENTS

AU 2023356403 A1 * 1/2025 ........... B60W 30/19
CN 1010413531 9/2007
(Continued)

OTHER PUBLICATIONS

International Search Report of the International Searching Authority for State Intellectual Property Office of the People's Republic of China in PCT application No. PCT/CN2023/121623 issued on Jan. 12, 2024, which is an international application to which this application claims priority.
(Continued)

*Primary Examiner* — Atul Trivedi
(74) *Attorney, Agent, or Firm* — Kolitch Romano Dascenzo Gates LLP

(57) ABSTRACT

A method for controlling gear shifting of a hybrid electric vehicle is applied to a transmission control unit, and includes: transmitting, at an interval of a preset time period and via a vehicle control unit (VCU), a first torque control instruction to a first microcontroller unit (MCU) and a second torque control instruction to a second MCU; transmitting, in response to a difference between a rotational
(Continued)

speed of an integrated starter and a rotational speed of the clutch being within a preset speed difference range and via the VCU, a rotational speed control instruction to the first MCU and a gear shift instruction to the second MCU; and transmitting, in response to receiving a TM gear-shifting completion instruction, at an interval of a preset time period and via the VCU, a third torque control instruction to the first MCU and a fourth torque control instruction to the second MCU.

20 Claims, 4 Drawing Sheets

(51) Int. Cl.
*B60W 10/06* (2006.01)
*B60W 10/08* (2006.01)
*B60W 10/11* (2012.01)
*B60W 30/18* (2012.01)
*B60W 30/19* (2012.01)
*B60W 50/00* (2006.01)

(52) U.S. Cl.
CPC ............ *B60W 10/08* (2013.01); *B60W 10/11* (2013.01); *B60W 30/18109* (2013.01); *B60W 30/19* (2013.01); *B60W 2050/0011* (2013.01); *B60W 2510/0283* (2013.01); *B60W 2510/0638* (2013.01); *B60W 2510/083* (2013.01); *B60W 2510/18* (2013.01); *B60W 2520/105* (2013.01); *B60W 2520/26* (2013.01); *B60W 2710/027* (2013.01); *B60W 2710/0644* (2013.01); *B60W 2710/0666* (2013.01); *B60W 2710/081* (2013.01); *B60W 2710/083* (2013.01); *B60W 2710/1005* (2013.01)

(58) Field of Classification Search
CPC ........... B60W 30/18109; B60W 30/19; B60W 2050/0011; B60W 2510/0283; B60W 2510/0638; B60W 2510/083; B60W 2510/18; B60W 2520/105; B60W 2520/26; B60W 2710/027; B60W 2710/0644
USPC .............................................................. 701/22
See application file for complete search history.

(56) References Cited

U.S. PATENT DOCUMENTS

| | | | | |
|---|---|---|---|---|
| 9,944,269 | B2 * | 4/2018 | Nefcy | B60W 10/11 |
| 10,106,149 | B2 * | 10/2018 | Zhao | B60K 6/387 |
| 11,932,254 | B1 * | 3/2024 | LaRoche | B60W 10/06 |
| 12,351,160 | B1 * | 7/2025 | Sinisi | B60W 10/02 |
| 2009/0171523 | A1 * | 7/2009 | Luo | B60W 10/02 180/65.23 |
| 2009/0233766 | A1 * | 9/2009 | Kadota | B60W 30/192 701/68 |
| 2009/0234524 | A1 * | 9/2009 | Kim | B60W 10/06 701/22 |
| 2013/0296113 | A1 * | 11/2013 | Nefcy | B60W 10/02 903/902 |
| 2013/0297105 | A1 * | 11/2013 | Yamazaki | B60W 10/06 903/902 |
| 2016/0059845 | A1 * | 3/2016 | Nefcy | B60W 20/30 180/65.265 |
| 2016/0304076 | A1 * | 10/2016 | Nefcy | B60W 20/30 |
| 2017/0197614 | A1 * | 7/2017 | Burt | B60K 6/48 |
| 2018/0134276 | A1 * | 5/2018 | Zhao | B60L 58/12 |
| 2018/0148065 | A1 * | 5/2018 | Jacoby | B60W 20/00 |
| 2018/0194342 | A1 * | 7/2018 | Mccullough | B60W 30/18127 |
| 2018/0306157 | A1 * | 10/2018 | Lee | B60W 10/30 |
| 2018/0372200 | A1 * | 12/2018 | Kumar | F16H 37/086 |
| 2019/0232941 | A1 * | 8/2019 | Wang | B60K 6/48 |
| 2019/0389452 | A1 * | 12/2019 | Duan | B60W 10/30 |
| 2020/0164864 | A1 * | 5/2020 | Palejiya | B60K 6/48 |
| 2021/0031745 | A1 * | 2/2021 | Tabata | B60W 20/15 |
| 2021/0078577 | A1 * | 3/2021 | Roques | B60L 15/2072 |
| 2021/0079962 | A1 * | 3/2021 | Song | B60W 20/40 |
| 2021/0086623 | A1 * | 3/2021 | Yao | B60W 30/18172 |
| 2021/0380094 | A1 * | 12/2021 | Choi | B60K 6/442 |
| 2022/0203957 | A1 * | 6/2022 | Yanase | B60W 10/02 |
| 2023/0311672 | A1 * | 10/2023 | Ebisumoto | B60L 15/2054 |
| 2024/0123995 | A1 * | 4/2024 | Yoon | B60W 30/18172 |
| 2024/0199027 | A1 * | 6/2024 | Yoon | B60L 15/20 |
| 2024/0399889 | A1 * | 12/2024 | Selvaraj | B60L 15/2009 |

FOREIGN PATENT DOCUMENTS

| | | | | | |
|---|---|---|---|---|---|
| CN | 104859638 | A | | 8/2015 | |
| CN | 106314194 | A | | 1/2017 | |
| CN | 106808993 | A | | 6/2017 | |
| CN | 107023668 | A | | 8/2017 | |
| CN | 111098848 | A | | 5/2020 | |
| CN | 113619586 | A | | 11/2021 | |
| CN | 114132319 | A | | 3/2022 | |
| CN | 115534926 | A | | 12/2022 | |
| EP | 4296099 | A1 | * | 12/2023 | B60W 10/08 |
| KR | 20200123298 | A | | 10/2020 | |
| KR | 20220045578 | A | | 4/2022 | |
| KR | 102598561 | B1 | * | 11/2023 | B60W 10/10 |
| KR | 20240011928 | A | * | 1/2024 | B60W 20/14 |
| RU | 2673323 | C1 | | 11/2018 | |

OTHER PUBLICATIONS

Zhao, Zhiguo et al.; "Optimal control in brake down-shifting process for hybrid electric car equipped with dry dual clutch transmission", Scientia Sinica Technologica, vol. 46, Issue 9: 950-960, Sep. 20, 2016.

* cited by examiner

METHOD AND APPARATUS FOR CONTROLLING GEAR SHIFTING OF HYBRID ELECTRIC VEHICLE, AND STORAGE MEDIUM

CROSS-REFERENCE TO RELATED APPLICATIONS

The present disclosure is a U.S. national phase application based on PCT/CN2023/121623, filed on Sep. 26, 2023, which claims priority to Chinese Patent Application No. 202211230507.7, filed on Oct. 8, 2022 and entitled “METHOD AND APPARATUS FOR CONTROLLING GEAR SHIFTING OF HYBRID ELECTRIC VEHICLE, AND STORAGE MEDIUM”, all of which are hereby incorporated by reference in their entireties for all purposes.

TECHNICAL FIELD

The present disclosure relates to the field of vehicle electric control technology, and in particular, relates to a method and apparatus for controlling gear shifting of a hybrid electric vehicle, and a storage medium.

BACKGROUND

With a series of social problems brought by the continuous increase in vehicle ownership, the depletion of fossil energy, and the deterioration of the atmospheric environment, the state has successively issued policies to encourage and require the development of new energy vehicles. However, pure electric new energy vehicles are affected by subjective and objective factors such as inconvenient charging and short range, which bring poor practical experience to users. Hybrid electric vehicles, which are also in the field of new energy vehicles, have gradually gained popularity in the market due to their superior energy saving and emission reduction as well as better user experience.

SUMMARY

In view of the above, the present disclosure provides a method and apparatus for controlling gear shifting of a hybrid electric vehicle, and a storage medium.

Specifically, the present disclosure includes the following technical solution.

In a first aspect, embodiments of the present disclosure provide a method for controlling gear shifting of a hybrid electric vehicle. The method is applied to a transmission control unit (TCU) connected to a vehicle control unit (VCU), wherein the VCU is connected to a first microcontroller unit (MCU) of an integrated starter generator (ISG), a second MCU of a traction motor (TM), and a clutch, and the method includes:

determining, in response to a received vehicle state transmitted by the VCU being a braking state or a sliding state, a first target torque value;

transmitting, once at an interval of a preset time period and via the VCU, a first torque control instruction to the first MCU and a second torque control instruction to the second MCU based on the first target torque value, wherein the first torque control instruction includes a torque control mode and a first torque value, the second torque control instruction includes a torque control mode and a second torque value, and a sum of the first torque value and the second torque value transmitted each time is equal to the first target torque value;

transmitting, in response to a difference between a received rotational speed of the ISG that is transmitted by the VCU and a received rotational speed of the clutch being within a preset speed difference range and via the VCU, a rotational speed control instruction to the first MCU and a gear shift instruction to the second MCU, wherein the rotational speed control instruction includes a rotational speed control mode and a target rotational speed; and transmitting, in response to receiving a TM gear-shifting completion instruction transmitted by the VCU, once at an interval of a preset time period and via the VCU, a third torque control instruction to the first MCU and a fourth torque control instruction to the second MCU based on the first target torque value, wherein the third torque control instruction includes a torque control mode and a third torque value, the fourth torque control instruction includes a torque control mode and a fourth torque value, and a sum of the third torque value and the fourth torque value transmitted each time is equal to the first target torque value.

In some embodiments, a difference between first torque values contained in two adjacent first torque control instructions transmitted to the first MCU via the VCU is the same as a difference between second torque values contained in corresponding second torque control instructions transmitted to the second MCU.

In some embodiments, transmitting, via the VCU, the first torque control instruction to the first MCU and the second torque control instruction to the second MCU, includes:

transmitting the first target torque value as the first torque value in the first torque control instruction transmitted to the first MCU via the VCU, and transmitting 0 as the second torque value in the second torque control instruction transmitted to the second MCU via the VCU.

In some embodiments, transmitting, via the VCU, the third torque control instruction to the first MCU and the fourth torque control instruction to the second MCU, includes:

transmitting 0 as the third torque value in the third torque control instruction transmitted to the first MCU via the VCU, and transmitting the first target torque value as the fourth torque value in the fourth torque control instruction transmitted to the second MCU via the VCU.

In some embodiments, the method further includes:

transmitting, via the VCU, a first pressure instruction to the clutch while transmitting, via the VCU, the first torque control instruction to the first MCU and the second torque control instruction to the second MCU, wherein the first pressure instruction includes a first pressure value, a first pressure value in a current first pressure instruction being greater than a first pressure value in a previous first pressure instruction.

In some embodiments, the method further includes:

transmitting, via the VCU, a second pressure instruction to the clutch while transmitting, via the VCU, the rotational speed control instruction to the first MCU and the gear shift instruction to the second MCU, wherein the second pressure instruction includes a second pressure value.

In some embodiments, the method further includes:

determining a second target torque value in the case that the difference between the received rotational speed of the ISG that is transmitted by the VCU and the received rotational speed of the clutch being within the preset speed difference range and in response to the received vehicle state transmitted by the VCU being an acceleration state;

transmitting, once at an interval of the preset time period and via the VCU, a fifth torque control instruction to the first MCU and the second pressure instruction to the clutch based on the second target torque value, wherein the fifth torque control instruction includes a torque control mode and a fifth torque value, and along with an increase of a quantity of transmitting times, a value of the fifth torque value is first decreased and then increased; and transmitting, in response to a received torque value of the ISG that is transmitted by the VCU being the second target torque value, once at an interval of the preset time period, a fourth pressure instruction to the clutch, wherein the fourth pressure instruction includes a fourth pressure value, a fourth pressure value in a current fourth pressure instruction being less than a fourth pressure value in a previous fourth pressure instruction.

In some embodiments, the method further includes:

transmitting, via the VCU, a third pressure instruction to the clutch while transmitting, via the VCU, the third torque control instruction to the first MCU and the fourth torque control instruction to the second MCU, wherein the third pressure instruction includes a third pressure value, a third pressure value in a current third pressure instruction being less than a third pressure value in a previous third pressure instruction.

In some embodiments, the rotational speed control mode is implemented by proportional-integral-derivative (PID) control.

In some embodiments, the preset speed difference range is 200 rpm to 400 rpm.

In a second aspect, embodiments of the present disclosure further provide an apparatus for controlling gear shifting of a hybrid electric vehicle. The apparatus includes:

a first torque value determining module, configured to determine, in response to a received vehicle state transmitted by a vehicle control unit (VCU) being a braking state or a sliding state, a first target torque value;

a first instruction transmitting module, configured to transmit, once at an interval of a preset time period and via the VCU, a first torque control instruction to a first microcontroller unit (MCU) and a second torque control instruction to a second MCU based on the first target torque value, wherein the first torque control instruction includes a torque control mode and a first torque value, the second torque control instruction includes a torque control mode and a second torque value, and a sum of the first torque value and the second torque value transmitted each time is equal to the first target torque value;

a second instruction transmitting module, configured to transmit, in response to a difference between a received rotational speed of an integrated starter generator (ISG) that is transmitted by the VCU and a received rotational speed of a clutch being within a preset speed difference range and via the VCU, a rotational speed control instruction to the first MCU and a gear shift instruction to the second MCU, wherein the rotational speed control instruction includes a rotational speed control mode and a target rotational speed; and a third instruction transmitting module, configured to transmit, in response to receiving a traction motor (TM) gear-shifting completion instruction transmitted by the VCU, once at an interval of the preset time period and via the VCU, a third torque control instruction to the first MCU and a fourth torque control instruction to the second MCU based on the first target torque value, wherein the third torque control instruction includes a torque control mode and a third torque value, the fourth torque control instruction includes a torque control mode and a fourth torque value, and a sum of the third torque value and the fourth torque value transmitted each time is equal to the first target torque value.

In some embodiments, a difference between first torque values contained in two adjacent first torque control instructions transmitted to the first MCU via the VCU is the same as a difference between second torque values contained in corresponding second torque control instructions transmitted to the second MCU.

In some embodiments, the first instruction transmitting module is specifically configured to:

transmit the first target torque value as the first torque value in the first torque control instruction transmitted to the first MCU via the VCU, and transmit 0 as the second torque value in the second torque control instruction transmitted to the second MCU via the VCU.

In some embodiments, the third instruction transmitting module is specifically configured to:

transmit 0 as the third torque value in the third torque control instruction transmitted to the first MCU via the VCU, and transmit the first target torque value as the fourth torque value in the fourth torque control instruction transmitted to the second MCU via the VCU.

In some embodiments, the apparatus further includes:

a forth instruction transmitting module, configured to transmit, via the VCU, a first pressure instruction to the clutch while transmitting, via the VCU, the first torque control instruction to the first MCU and the second torque control instruction to the second MCU, wherein the first pressure instruction includes a first pressure value, a first pressure value in a current first pressure instruction being greater than a first pressure value in a previous first pressure instruction.

In some embodiments, the apparatus further includes:

a fifth instruction transmitting module, configured to transmit, via the VCU, a second pressure instruction to the clutch while transmitting, via the VCU, the rotational speed control instruction to the first MCU and the gear shift instruction to the second MCU, wherein the second pressure instruction includes a second pressure value.

In some embodiments, the apparatus further includes:

a second torque value determining module, configured to determine a second target torque value in the case that the difference between the received rotational speed of the ISG that is transmitted by the VCU and the received rotational speed of the clutch being within the preset speed difference range and in response to the received vehicle state transmitted by the VCU being an acceleration state;

a sixth instruction transmitting module, configured to transmit, once at an interval of the preset time period and via the VCU, a fifth torque control instruction to the first MCU and the second pressure instruction to the clutch based on the second target torque value, wherein the fifth torque control instruction includes a torque control mode and a fifth torque value, and along with an increase of a quantity of transmitting times, a value of the fifth torque value is first decreased and then increased; and a seventh instruction transmitting module, configured to transmit, in response to a received torque value of the ISG that is transmitted by the VCU being the second target torque value, once at an interval of the preset time period, a fourth pressure instruction to the clutch, wherein the fourth pressure instruction includes a fourth pressure value, a fourth pressure value in a current fourth pressure instruction being less than a fourth pressure value in a previous fourth pressure instruction.

In some embodiments, the apparatus further includes:

an eighth instruction transmitting module, configured to transmit, via the VCU, a third pressure instruction to the clutch while transmitting, via the VCU, the third torque control instruction to the first MCU and the fourth torque control instruction to the second MCU, wherein the third pressure instruction includes a third pressure value, a third pressure value in a current third pressure instruction being less than a third pressure value in a previous third pressure instruction.

In some embodiments, the rotational speed control mode is implemented by proportional-integral-derivative (PID) control.

In some embodiments, the preset speed difference range is 200 rpm to 400 rpm.

In a third aspect, embodiments of the present disclosure further provide a non-transitory computer-readable storage medium storing at least one computer instruction. The at least one computer instruction, when loaded and executed by a processor, causes the processor to perform the method for controlling gear shifting of the hybrid electric vehicle as defined in the above first aspect.

BRIEF DESCRIPTION OF THE DRAWINGS

For describing the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
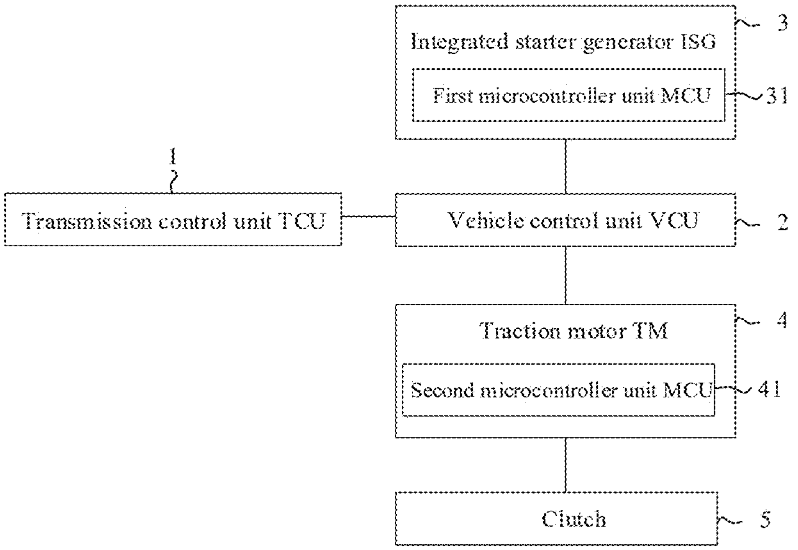
FIG. 1 is a scene schematic diagram of a method for controlling gear shifting of a hybrid electric vehicle according to some embodiments of the present disclosure.

The reference numerals in the drawings are respectively denoted as:

1—Transmission control unit TCU; 2—Vehicle control unit VCU; 3—integrated starter generator ISG, 31—First microcontroller unit MCU; 4—traction motor TM, 41—second microcontroller unit MCU; and 5—Clutch.

DETAILED DESCRIPTION

The technical solutions in embodiments of the present disclosure will be described hereinafter with reference to the accompanying drawings in the embodiments of the present disclosure, and it is apparent that the described embodiments are only a part, but not all of the embodiments of the present disclosure. All other embodiments obtained by those of ordinary skill in the art without creative efforts with respect to the embodiments in the present disclosure shall fall within the protection scope of the present disclosure.

Unless otherwise defined, all technical terms used in the embodiments of the present disclosure have the same meaning as commonly understood by those of ordinary skills in the art. Some technical terms appearing in the embodiments of the present disclosure are explained hereinafter.

FIG. 1 is a scene schematic diagram of a method for controlling gear shifting of a hybrid electric vehicle according to some embodiments of the present disclosure. Referring to FIG. 1, a transmission control unit (TCU) 1, a vehicle control unit (VCU) 2, an integrated starter generator (ISG) 3, a traction motor (TM) 4, and a clutch 5 are included in the hybrid electric vehicle.

The ISG 3 includes a first microcontroller unit (MCU) 31, and the TM 4 includes a second microcontroller unit (MCU) 41. The TCU 1 is connected to the VCU 2, and the VCU 2 is connected to the first MCU 31, the second MCU 41, and the clutch 5, respectively.

In some embodiments, the TCU 1 is configured to receive information transmitted from the VCU 2, and transmit the information to the VCU 2 after performing corresponding processing. The VCU 2 is used for being connected to various components on the vehicle, such as the ISG 3, the TM 4 and the clutch 5, and can control the various components to perform corresponding actions. The ISG 3 and the TM are configured to convert electrical energy into mechanical energy when in an operating state, convert mechanical energy into electrical energy when in a power generation mode, and neither convert electrical energy into mechanical energy nor convert mechanical energy into electrical energy when in an inoperative state. The clutch 5 is configured to cooperate with the TM and the ISG to realize the transmission of a torque.

Currently, during deceleration braking of the hybrid electric vehicle, the TM provides a negative torque for wheels to decelerate the vehicle. However, TM gear shifting is synchronizer gear shifting, requiring to pass through a neutral position. In the neutral position, the TM is temporarily unable to provide the negative torque for the wheels. The transient loss of the torque easily causes a sudden acceleration of the hybrid electric vehicle in the gear shifting process, affecting the smoothness of traveling.

Figure 2:
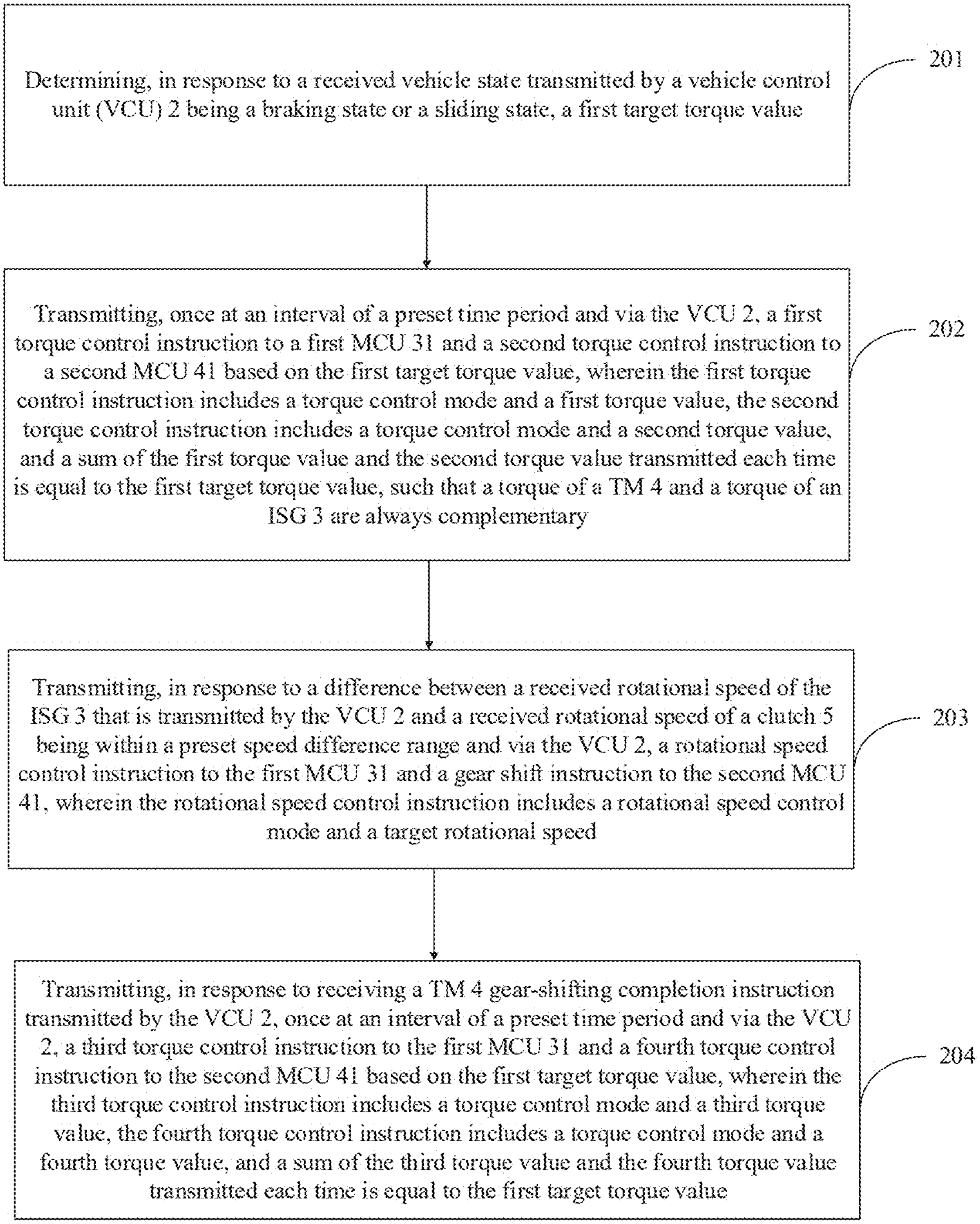
FIG. 2 is a flowchart of a method for controlling gear shifting of a hybrid electric vehicle according to some embodiments of the present disclosure.

FIG. 2 is a flowchart of a method for controlling gear shifting of a hybrid electric vehicle according to some embodiments of the present disclosure. Referring to FIG. 2, the method is applied to the transmission control unit (TCU) 1. The method includes the following steps.

In step 201, in response to a received vehicle state transmitted by a vehicle control unit (VCU) 2 being a braking state or a sliding state, a first target torque value is determined.

In the case that the TCU 1 receives a vehicle state transmitted from the VCU 2 as the braking state or the sliding state, it indicates that a downshift operation is required for the TM that is operating in this case, and the first target torque value needs to be determined to meet the torque required at the wheel ends of the vehicle during gear shifting.

In step 202, a first torque control instruction is transmitted to the first MCU 31 and a second torque control instruction is transmitted to the second MCU 41 once at an interval of a preset time period via the VCU 2 based on the first target torque value, wherein the first torque control instruction includes a torque control mode and a first torque value, the second torque control instruction includes a torque control mode and a second torque value, and a sum of the first torque value and the second torque value transmitted each time is equal to the first target torque value, such that a torque of the TM 4 and a torque of the ISG 3 are always complementary.

In the case that the torque of the motor changes too quickly when the vehicle needs gear shifting during driving, it is easily lead to unstable driving, affecting the driving and riding experience of the occupants. Therefore, in the case that the vehicle state is determined as the braking state or the sliding state, the TCU 1 needs to transmit, once at an interval of the preset time period, the first torque control instruction to the first MCU 31 of the ISG via the VCU 2 to gradually increase the torque of the ISG 3, and the second torque control instruction to the second MCU 41 of the TM via the VCU 2 to gradually decrease the torque of the TM 4. In this stage, the ISG 3 can gradually replace the TM 4 to provide the negative torque for the wheels, and the continuity of the negative torque applied to the wheel ends of the vehicle is maintained, such that the vehicle can run smoothly.

It should be noted that, control modes are preset in the first MCU 31 and the second MCU 41, and in the case that the TCU 1 transmits the instructions to the first MCU 31 and the second MCU 41, the instructions need to include control information to determine the control modes of the ISG and the TM.

In some embodiments, the control modes include a torque control mode and a rotational speed control mode.

It should be noted that, in the case that the ISG 3 or the TM 4 works in the torque control mode, the first MCU 31 or the second MCU 41 may acquire a difference between a target rotational speed and the current rotational speed of the ISG 3 or the TM 4, a corresponding required current value is determined based on "voltage-speed-current" MAP data, and the current value is output to a stator of the ISG 3 or the TM 4 via a current control module IGBT, so as to achieve the required torque.

In some embodiments, in order to ensure that the torque of the TM and the torque of the ISG change in the same way, a difference between first torque values contained in two adjacent first torque control instructions transmitted to the first MCU 31 via the VCU 2 is the same as a difference between second torque values contained in corresponding second torque control instructions transmitted to the second MCU 41. That is, an amount of increase in the torque value of the ISG 3 is the same as an amount of decrease in the torque value of the TM 4.

Figure 3:
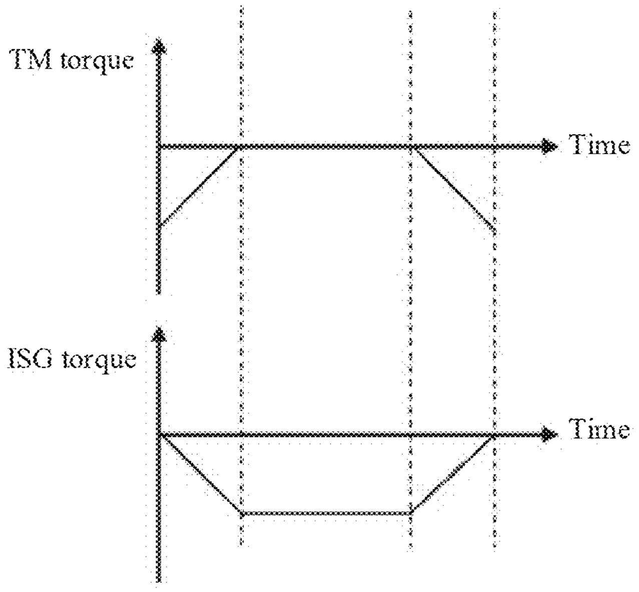
FIG. 3 is a schematic diagram of time-dependent changes of a torque of an ISG and a torque of a TM in a method for controlling gear shifting of a hybrid electric vehicle according to some embodiments of the present disclosure.

Exemplarily, FIG. 3 is a schematic diagram of time-dependent changes of a torque of an ISG and a torque of a TM in a method for controlling gear shifting of a hybrid electric vehicle according to some embodiments of the present disclosure. Referring to FIG. 3, in order from left to right, within a time period before a first vertical dotted line, in a negative direction, the torque value of the TM 4 is gradually decreased, the torque value of the ISG 3 is gradually increased, and the amount of decrease in the torque value of the TM 4 is the same as the amount of increase in the torque value of the ISG 3.

In some embodiments, transmitting, via the VCU 2, the first torque control instruction to the first MCU 31 and the second torque control instruction to the second MCU 41, includes transmitting the first target torque value as the first torque value in the first torque control instruction transmitted to the first MCU 31 via the VCU 2, and transmitting 0 as the second torque value in the second torque control instruction transmitted to the second MCU 41 via the VCU. In this case, the ISG 3 can completely replace the TM 4 to provide the negative torque for the wheels, such that the TM 4 can be conveniently and subsequently shifted to neutral gear and speed regulation and gear shifting.

Exemplarily, referring to FIG. 3, in order from left to right, at a time corresponding to the first vertical dotted line, the torque value of the ISG is the first target torque value, and the torque value of the TM is 0.

In some embodiments, a first pressure instruction is transmitted to the clutch 5 via the VCU 2 while the first torque control instruction is transmitted to the first MCU 31 via the VCU 2 and the second torque control instruction is transmitted to the second MCU 41 via the VCU 2. The first pressure instruction includes a first pressure value, a first pressure value in a current first pressure instruction being greater than a first pressure value in a previous first pressure instruction.

The TCU 1 also needs to control the torque of the clutch 5 while controlling the ISG 3 and the TM 4. Therefore, the first pressure instruction is transmitted to the clutch 5 while the first torque control instruction is transmitted to the first MCU 31 and the second torque control instruction is transmitted to the second MCU 41 once at an interval of a preset time period, such that the pressure applied to the clutch 5 is gradually increased, so as to increase the capacity of transmitting the torque.

Figure 4:
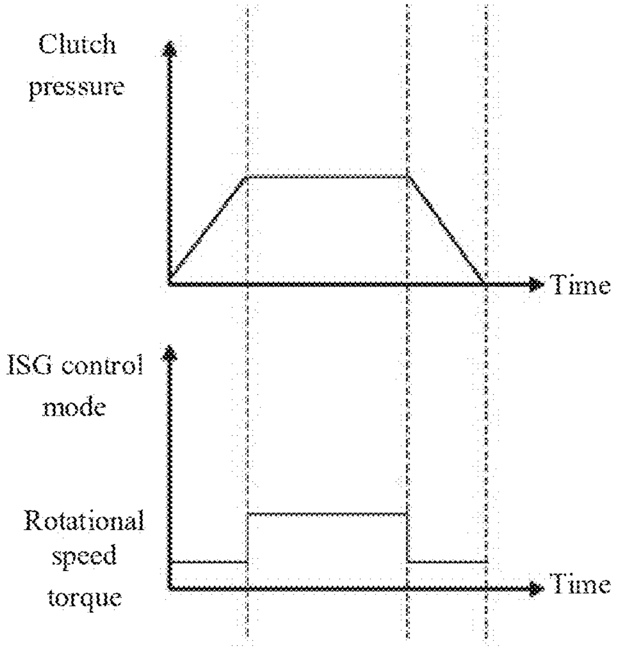
FIG. 4 is a schematic diagram of time-dependent changes of a pressed state of a clutch and a control mode of an ISG in a method for controlling gear shifting of a hybrid electric vehicle according to some embodiments of the present disclosure.

Exemplarily, FIG. 4 is a schematic diagram of time-dependent changes of a pressed state of a clutch and a control mode of an ISG in a method for controlling gear shifting of a hybrid electric vehicle according to some embodiments of the present disclosure. Referring to FIG. 4, in order from left to right, within a time period before a first vertical dotted line, in the case that the ISG 3 is in the torque control mode, the pressure applied to the clutch 5 is gradually increased.

In step 203, in response to a difference between a received rotational speed of the ISG 3 that is transmitted by the VCU 2 and a received rotational speed of a clutch 5 being within a preset speed difference range, a rotational speed control instruction is transmitted to the first MCU 31 via the VCU 2 and a gear shift instruction is transmitted to the second MCU 41 via the VCU 2, wherein the rotational speed control instruction includes a rotational speed control mode and a target rotational speed.

In the case that the speed difference exists between the rotational speed of the ISG 3 and the rotational speed of the clutch 5 and the speed difference is within the preset speed difference range, the torque control mode is not suitable for the ISG that is operating in this case, and the ISG alone needs to provide the negative torque, such that the TCU 1 needs to change the control mode of the ISG 3 via the VCU 2 and control the TM to perform neutral gear taking and gear shifting operations. At this stage, the negative torque carried by the TM is completely transferred to the ISG, and the TM can be shifted to neutral gear and then perform speed regulation and gear shifting.

It should be noted that the speed difference between the rotational speed of the ISG 3 and the rotational speed of the clutch 5 is within the preset speed difference range, such that the ISG 3 can still provide a corresponding negative torque in the rotational speed control mode, and is kept in a slipping state with the clutch 5. It should be understood that the clutch 5 is pressed to have a torque transmission capacity under a corresponding pressure, and the required torque transmission capacity is calculated by dividing by a transmission ratio based on the wheel-end torque demand, and the ISG 3 needs to output a torque which is relative in magnitude and opposite in direction to the torque of the clutch 5, so as to achieve the purpose of controlling the rotational speed.

In some embodiments, the rotational speed control mode is implemented by proportional-integral-derivative (PID) control.

It should be noted that the PID control, also referred to as a PID control system, is a control system for controlling the proportional, integral and derivative of an error generated by comparing real-time data collected information of a controlled object with a given value during the industrial process control. The PID control has the advantages of simple principle, strong robustness, wide practical range, and the like. The PID control is linear control in which a controlled object is controlled by linearly combining a proportion (P), an integral (I), and a derivative (D) of a deviation between a given value r(t) and an actual output value y(t) in the form of coefficients.

In some embodiments, the first MCU 31 or the second MCU 41 acquires a difference value between the target rotational speed and the current rotational speed of the ISG 3 or the TM 4, the required torque value of the ISG or the TM 4 is determined by operation of a proportional coefficient, an integral time constant, and a derivative time constant, the corresponding required current value is determined by looking up the "voltage-speed-current" MAP data, then an IGBT module is controlled to output the current value to the stator of the ISG 3 or the TM 4 to reach the required torque, an increase in torque of the ISG 3 or the TM 4 in the process increases the rotational speed of the motor, and a decrease in torque of the ISG 3 or the TM 4 in the process can slow down the increase of the rotational speed of the ISG 3 or the TM 4. The required torque can be automatically calculated according to the difference value between the actual rotational speed and the target rotational speed through the regulation of PID, such that the rotational speed control is realized, and the target rotational speed is quickly and stably reached.

Exemplarily, referring to FIG. 3, in order from left to right, within a time period between the first vertical dotted line and a second vertical dotted line, in a negative direction, the torque value of the TM 4 is 0, and the torque value of the ISG 3 is the target torque value.

In some embodiments, the preset speed difference range is 200 rpm to 400 rpm.

In the case that the difference between the rotational speeds of the ISG 3 and the clutch 5 is within the range of 200 rpm to 400 rpm, the smoothness of the vehicle is best.

In some embodiments, a second pressure instruction is transmitted to the clutch 5 via the VCU 2 while the rotational speed control instruction is transmitted to the first MCU 31 via the VCU 2 and the gear shift instruction is transmitted to the second MCU 41 via the VCU 2, wherein the second pressure instruction includes a second pressure value.

At this stage, the TCU 1 needs to control the torque of the clutch 5 while controlling the ISG 3 and the TM 4. Therefore, the second pressure instruction is transmitted to the clutch 5 via the VCU 2, such that the pressure value applied to the clutch 5 is kept at the second pressure value, and a speed difference existing between the rotational speed of the ISG and the rotational speed of the clutch 5 can be ensured.

Exemplarily, referring to FIG. 4, in order from left to right, within a time period between the first vertical dotted line and a second vertical dotted line, the ISG 3 is in the rotational speed control mode, and the pressure applied to the clutch 5 is kept at the second pressure value.

In some embodiments, in the process of implementing the step, in the case that a driver has an acceleration demand in the gear shifting process, the method for controlling gear shifting of the hybrid electric vehicle provided by the embodiments of the present disclosure further includes the following steps:

In a first step, in the case that the difference between the received rotational speed of the ISG 3 that is transmitted by the VCU 2 and the received rotational speed of the clutch 5 being within the preset speed difference range, in response to the received vehicle state transmitted by the VCU 2 being an acceleration state, a second target torque value is determined.

The TCU 1 receives the vehicle state transmitted by the VCU 2 as the acceleration state, indicating that the driver has an acceleration request in the gear shifting process, and the second target torque value needs to be re-determined.

It should be understood that in this step, the negative torque carried by the TM 4 has been completely transferred to the ISG 3, and therefore, in this case, the second target torque value is now acting on the ISG 3.

In a second step, a fifth torque control instruction is transmitted to the first MCU 31 and the second pressure instruction is transmitted to the clutch 5 once at an interval of the preset time period via the VCU 2 based on the second target torque value, wherein the fifth torque control instruction includes a torque control mode and a fifth torque value, and along with an increase of a quantity of transmitting times, a value of the fifth torque value is first decreased and then increased.

In the case that the TCU 1 receives a state of an accelerator as a pressed state, that is, the driver presses the accelerator to accelerate, in this case, the ISG 3 is no longer suitable for control by using the rotational speed control mode, and needs to be switched to the torque control mode again for control. Therefore, the TCU 1 transmits the fifth torque control instruction to the first MCU 31 via the VCU 2, such that the ISG is switched from the rotational speed control mode to the torque control mode, and the vehicle is driven to run by converting the negative torque into a positive torque. Meanwhile, in order to achieve cooperation with the ISG 3, the TCU 1 also needs to transmit the second pressure instruction to the clutch 5 via the VCU 2, such that the clutch 5 is pressed to be closed to complete a synchronization action quickly.

In a third step, in response to a received torque value of the ISG 3 that is transmitted by the VCU 2 being the second target torque value, a fourth pressure instruction is transmitted to the clutch 5 once at an interval of the preset time period, wherein the fourth pressure instruction includes a fourth pressure value, a fourth pressure value in a current fourth pressure instruction being less than a fourth pressure value in a previous fourth pressure instruction.

In the case that the torque value of the ISG 3 is the second target torque value, the pressure value applied to the clutch 5 is gradually decreased, such that the rotational speed of the ISG is synchronized with the rotational speed of the clutch 5.

In step 204, in response to receiving a TM 4 gear-shifting completion instruction transmitted by the VCU 2, a third torque control instruction is transmitted to the first MCU 31 and a fourth torque control instruction is transmitted to the second MCU 41 once at an interval of the preset time period via the VCU 2 based on the first target torque value, wherein the third torque control instruction includes a torque control mode and a third torque value, the fourth torque control instruction includes a torque control mode and a fourth torque value, and a sum of the third torque value and the fourth torque value transmitted each time is equal to the first target torque value.

After the TM 4 has completed gear shifting, the TM 4 replaces the ISG 3, and provides the negative torque for the wheels again. In this case, the TCU 1 needs to transmit, once at an interval of the preset time period, the third torque control instruction to the first MCU 31 via the VCU 2 to gradually decrease the torque of the ISG 3, and the fourth torque control instruction to the second MCU 41 via the VCU 2 to control to gradually increase the torque of the TM 4. In this stage, the TM 4 can gradually replace the ISG 3 to provide the negative torque for the wheels, and the continuity of the negative torque applied to the wheel ends of the vehicle is maintained, such that the vehicle can run smoothly.

In some embodiments, in order to ensure that the torque of the TM and the torque of the ISG change in the same way, a difference between third torque values contained in two adjacent third torque control instructions transmitted to the first MCU 31 via the VCU 2 is the same as a difference between fourth torque values contained in corresponding fourth torque control instructions transmitted to the second MCU 41. That is, an amount of decrease in the torque value of the ISG 3 is the same as an amount of increase in the torque value of the TM 4.

In some embodiments, transmitting, via the VCU 2, the third torque control instruction to the first MCU 31 and the fourth torque control instruction to the second MCU 41, includes transmitting 0 as the third torque value in the third torque control instruction transmitted to the first MCU 31 via the VCU 2, and transmitting the first target torque value as the fourth torque value in the fourth torque control instruction transmitted to the second MCU 41 via the VCU 2. In this case, the TM 4 can completely replace the ISG 3 to provide the negative torque for the wheels, that is, the gear shifting operation of the TM 4 is completed.

Exemplarily, referring to FIG. 3, in order from left to right, within a time period between the second vertical dotted line and a third vertical dotted line, in a negative direction, the torque value of the TM 4 is gradually increased, the torque value of the ISG 3 is gradually decreased, and the amount of increase in the torque value of the TM 4 is the same as the amount of decrease in the torque value of the ISG 3.

In some embodiments, a third pressure instruction is transmitted to the clutch 5 via the VCU 2 while the third torque control instruction is transmitted to the first MCU 31 and the fourth torque control instruction is transmitted to the second MCU 41 via the VCU 2, wherein the third pressure instruction includes a third pressure value, and a third pressure value in a current third pressure instruction is less than a third pressure value in a previous third pressure instruction.

In this stage, the TCU 1 also needs to control the torque of the clutch 5 while controlling the ISG 3 and the TM 4. Therefore, the third pressure instruction is transmitted to the clutch 5 while the third torque control instruction is transmitted to the first MCU 31 and the fourth torque control instruction is transmitted to the second MCU 41 once at an interval of the preset time period, such that the pressure applied to the clutch 5 is gradually decreased, so as to decrease the capacity of transmitting the torque until the clutch 5 is separated from the ISG 3.

Exemplarily, referring to FIG. 4, in order from left to right, within a time period between the second vertical dotted line and a third vertical dotted line, the ISG 3 is in the torque control mode, and the pressure applied to the clutch 5 is gradually decreased.

Therefore, according to the method for controlling gear shifting of the hybrid electric vehicle provided by the embodiments of the present disclosure, in the case that the hybrid electric vehicle is in the braking state or the sliding state, the TCU 1 is used to control the first MCU 31 of the ISG 3 to cooperate with the second MCU 41 of the TM 4 to replace a torque value, such that during gear shifting of the TM 4, the ISG 3 can timely make up for the torque lost by the TM 4 in the neutral gear taking and gear shifting processes, and the torque of the ISG 3 is transferred to the TM 4 again after the TM 4 completes gear shifting, thereby avoiding a lack of the torque of the TM 4 in the gear shifting process, solving the problem of sudden acceleration that may occur in the vehicle in the gear shifting process, ensuring the smoothness of traveling, and optimizing the driving and riding experience of the occupants.

Figure 5:
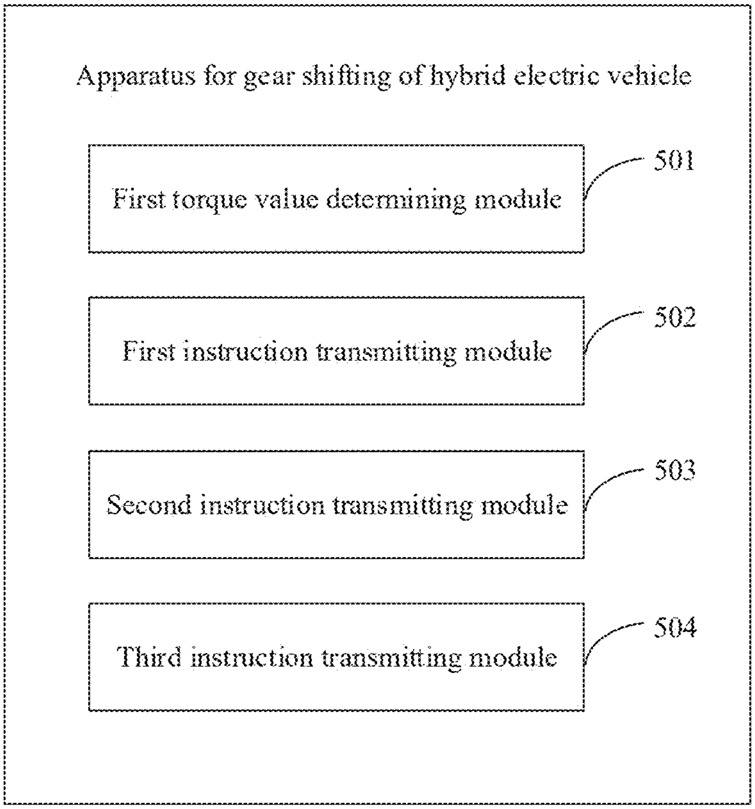
FIG. 5 is a schematic structural diagram of an apparatus for controlling gear shifting of a hybrid electric vehicle according to some embodiments of the present disclosure.

The embodiments of the present disclosure further provide an apparatus for controlling gear shifting of a hybrid electric vehicle. The apparatus may be arranged in a transmission control unit (TCU). As shown in FIG. 5, the apparatus includes:

- a first torque value determining module 501, configured to determine, in response to a received vehicle state transmitted by a vehicle control unit (VCU) being a braking state or a sliding state, a first target torque value;
- a first instruction transmitting module 502, configured to transmit, once at an interval of a preset time period and via the VCU, a first torque control instruction to a first microcontroller unit (MCU) and a second torque control instruction to a second MCU based on the first target torque value, wherein the first torque control instruction includes a torque control mode and a first torque value, the second torque control instruction includes a torque control mode and a second torque value, and a sum of the first torque value and the second torque value transmitted each time is equal to the first target torque value;
- a second instruction transmitting module 503, configured to transmit, in response to a difference between a received rotational speed of an integrated starter generator (ISG) that is transmitted by the VCU and a received rotational speed of a clutch being within a preset speed difference range and via the VCU, a rotational speed control instruction to the first MCU and a gear shift instruction to the second MCU, wherein the rotational speed control instruction includes a rotational speed control mode and a target rotational speed; and a third instruction transmitting module 504, configured to transmit, in response to receiving a traction motor (TM) gear-shifting completion instruction transmitted by the VCU, once at an interval of the preset time period and via the VCU, a third torque control instruction to the first MCU and a fourth torque control instruction to the second MCU based on the first target torque value, wherein the third torque control instruction includes a torque control mode and a third torque value, the fourth torque control instruction includes a torque control mode and a fourth torque value, and a sum of the third torque value and the fourth torque value transmitted each time is equal to the first target torque value.

In some embodiments, a difference between first torque values contained in two adjacent first torque control instructions transmitted to the first MCU via the VCU is the same as a difference between second torque values contained in corresponding second torque control instructions transmitted to the second MCU.

In some embodiments, the first instruction transmitting module 502 is specifically configured to transmit the first target torque value as the first torque value in the first torque control instruction transmitted to the first MCU via the VCU, and transmit 0 as the second torque value in the second torque control instruction transmitted to the second MCU via the VCU.

In some embodiments, the third instruction transmitting module 504 is specifically configured to transmit 0 as the third torque value in the third torque control instruction transmitted to the first MCU via the VCU, and transmit the first target torque value as the fourth torque value in the fourth torque control instruction transmitted to the second MCU via the VCU.

In some embodiments, the apparatus further includes a forth instruction transmitting module, configured to transmit, via the VCU, a first pressure instruction to the clutch while transmitting, via the VCU, the first torque control instruction to the first MCU and the second torque control instruction to the second MCU, wherein the first pressure instruction includes a first pressure value, a first pressure value in a current first pressure instruction being greater than a first pressure value in a previous first pressure instruction.

In some embodiments, the apparatus further includes a fifth instruction transmitting module, configured to transmit, via the VCU, a second pressure instruction to the clutch while transmitting, via the VCU, the rotational speed control instruction to the first MCU and the gear shift instruction to the second MCU, wherein the second pressure instruction includes a second pressure value.

In some embodiments, the apparatus further includes:

a second torque value determining module, configured to determine a second target torque value in the case that the difference between the received rotational speed of the ISG that is transmitted by the VCU and the received rotational speed of the clutch being within the preset speed difference range and in response to the received vehicle state transmitted by the VCU being an acceleration state;

a sixth instruction transmitting module, configured to transmit, once at an interval of the preset time period and via the VCU, a fifth torque control instruction to the first MCU and the second pressure instruction to the clutch based on the second target torque value, wherein the fifth torque control instruction includes a torque control mode and a fifth torque value, and along with an increase of a quantity of transmitting times, a value of the fifth torque value is first decreased and then increased; and a seventh instruction transmitting module, configured to transmit, in response to a received torque value of the ISG that is transmitted by the VCU being the second target torque value, once at an interval of the preset time period, a fourth pressure instruction to the clutch, wherein the fourth pressure instruction includes a fourth pressure value, a fourth pressure value in a current fourth pressure instruction being less than a fourth pressure value in a previous fourth pressure instruction.

In some embodiments, the apparatus further includes an eighth instruction transmitting module, configured to transmit, via the VCU, a third pressure instruction to the clutch while transmitting, via the VCU, the third torque control instruction to the first MCU and the fourth torque control instruction to the second MCU, wherein the third pressure instruction includes a third pressure value, a third pressure value in a current third pressure instruction being less than a third pressure value in a previous third pressure instruction.

In some embodiments, the rotational speed control mode is implemented by proportional-integral-derivative (PID) control.

In some embodiments, the preset speed difference range is 200 rpm to 400 rpm.

According to the apparatus for controlling gear shifting of the hybrid electric vehicle provided by the embodiments of the present disclosure, in the case that the hybrid electric vehicle is in the braking state or the sliding state, the ISG can timely make up for the torque lost by the TM in the neutral gear taking and gear shifting processes, and the torque of the ISG is transferred to the TM again after the TM completes gear shifting, thereby avoiding a lack of the torque of the TM in the gear shifting process, solving the problem of sudden acceleration that may occur in the vehicle in the gear shifting process, ensuring the smoothness of traveling, and optimizing the driving and riding experience of the occupants.

The present embodiments and the method embodiments are based on the same inventive concept and the present embodiments are apparatus embodiments corresponding to the method embodiments. Therefore, it should be understood by those skilled in the art that the description of the method embodiments is also applicable to the present embodiments, and some technical details are not described in the present embodiments.

The embodiments of the present disclosure further provide a vehicle. The vehicle includes the apparatus for controlling gear shifting of the hybrid electric vehicle provided by the previous embodiments.

Based on the same inventive concept, corresponding to any one of the above-described method embodiments, the present disclosure further provides a non-transitory computer-readable storage medium storing at least one computer instruction. The at least one computer instruction, when loaded and executed by a processor, causes the processor to perform the method for controlling gear shifting of the hybrid electric vehicle as defined in the above-described method embodiments.

Based on the same inventive concept, corresponding to any one of the above-described method embodiments, the present disclosure further provides a computer program product including at least one computer program or at least one computer instruction. The at least one computer program or at least one computer instruction, when executed by a processor, causes the processor to perform the method for controlling gear shifting of the hybrid electric vehicle as defined in the above-described method embodiments.

In the present disclosure, the terms "first" and "second" are merely used for descriptive purposes and should not be construed as indicating or implying the relative importance. The term "a plurality of" refers to two or more, unless otherwise explicitly defined.

Other implementation solutions of the present disclosure are apparent to those skilled in the art from consideration of the specification and practice of the present disclosure disclosed herein. The present disclosure is intended to cover any variations, uses, or adaptations of the present disclosure following the general principles of the present disclosure and including known common knowledge or customary technical means undisclosed in the art of the present disclosure. The specification and embodiments are only considered as exemplary.

It should be understood that the present disclosure is not limited to the precise arrangements that have been described above and shown in the accompanying drawings, and that various modifications and changes may be made without departing from the scope thereof. The scope of the present disclosure is limited only by the appended claims.

The invention claimed is:

1. A method for controlling gear shifting of a hybrid electric vehicle, being applied to a transmission control unit (TCU) connected to a vehicle control unit (VCU), wherein the VCU is connected to a first microcontroller unit (MCU) of an integrated starter generator (ISG), a second MCU of a traction motor (TM), and a clutch, the method comprising:

determining, in response to a received vehicle state transmitted by the VCU being a braking state or a sliding state, a first target torque value;

transmitting, once at an interval of a preset time period and via the VCU, a first torque control instruction to the first MCU and a second torque control instruction to the second MCU based on the first target torque value, wherein the first torque control instruction comprises a torque control mode and a first torque value, the second torque control instruction comprises a torque control mode and a second torque value, and a sum of the first torque value and the second torque value transmitted each time is equal to the first target torque value;

transmitting, in response to a difference between a received rotational speed of the ISG that is transmitted by the VCU and a received rotational speed of the clutch being within a preset speed difference range and via the VCU, a rotational speed control instruction to the first MCU and a gear shift instruction to the second MCU, wherein the rotational speed control instruction comprises a rotational speed control mode and a target rotational speed; and transmitting, in response to receiving a TM gear-shifting completion instruction transmitted by the VCU, once at an interval of a preset time period and via the VCU, a third torque control instruction to the first MCU and a fourth torque control instruction to the second MCU based on the first target torque value, wherein the third torque control instruction comprises a torque control mode and a third torque value, the fourth torque control instruction comprises a torque control mode and a fourth torque value, and a sum of the third torque value and the fourth torque value transmitted each time is equal to the first target torque value.

2. The method for controlling gear shifting of the hybrid electric vehicle according to claim 1, wherein a difference between first torque values contained in two adjacent first torque control instructions transmitted to the first MCU via the VCU is a same as a difference between second torque values contained in corresponding second torque control instructions transmitted to the second MCU.

3. The method for controlling gear shifting of the hybrid electric vehicle according to claim 1, wherein said transmitting, via the VCU, the first torque control instruction to the first MCU and the second torque control instruction to the second MCU comprises:

transmitting the first target torque value as the first torque value in the first torque control instruction transmitted to the first MCU via the VCU, and transmitting 0 as the second torque value in the second torque control instruction transmitted to the second MCU via the VCU.

4. The method for controlling gear shifting of the hybrid electric vehicle according to claim 1, wherein said transmitting, via the VCU, the third torque control instruction to the first MCU and the fourth torque control instruction to the second MCU comprises:

transmitting 0 as the third torque value in the third torque control instruction transmitted to the first MCU via the VCU, and transmitting the first target torque value as the fourth torque value in the fourth torque control instruction transmitted to the second MCU via the VCU.

5. The method for controlling gear shifting of the hybrid electric vehicle according to claim 1, further comprising:

transmitting, via the VCU, a first pressure instruction to the clutch while transmitting, via the VCU, the first torque control instruction to the first MCU and the second torque control instruction to the second MCU, wherein the first pressure instruction comprises a first pressure value, a first pressure value in a current first pressure instruction being greater than a first pressure value in a previous first pressure instruction.

6. The method for controlling gear shifting of the hybrid electric vehicle according to claim 1, further comprising:

transmitting, via the VCU, a second pressure instruction to the clutch while transmitting, via the VCU, the rotational speed control instruction to the first MCU and the gear shift instruction to the second MCU, wherein the second pressure instruction comprises a second pressure value.

7. The method for controlling gear shifting of the hybrid electric vehicle according to claim 6, further comprising:

determining a second target torque value in a case that the difference between the received rotational speed of the ISG that is transmitted by the VCU and the received rotational speed of the clutch being within the preset speed difference range, and in response to the received vehicle state transmitted by the VCU being an acceleration state;

transmitting, once at an interval of the preset time period and via the VCU, a fifth torque control instruction to the first MCU and the second pressure instruction to the clutch based on the second target torque value, wherein the fifth torque control instruction comprises a torque control mode and a fifth torque value, and along with an increase of a quantity of transmitting times, a value of the fifth torque value is first decreased and then increased; and transmitting, in response to a received torque value of the ISG that is transmitted by the VCU being the second target torque value, once at an interval of the preset time period, a fourth pressure instruction to the clutch, wherein the fourth pressure instruction comprises a fourth pressure value, a fourth pressure value in a current fourth pressure instruction being less than a fourth pressure value in a previous fourth pressure instruction.

8. The method for controlling gear shifting of the hybrid electric vehicle according to claim 1, further comprising:

transmitting, via the VCU, a third pressure instruction to the clutch while transmitting, via the VCU, the third torque control instruction to the first MCU and the fourth torque control instruction to the second MCU, wherein the third pressure instruction comprises a third pressure value, a third pressure value in a current third pressure instruction being less than a third pressure value in a previous third pressure instruction.

9. The method for controlling gear shifting of the hybrid electric vehicle according to claim 1, wherein the rotational speed control mode is implemented by proportional-integral-derivative (PID) control.

10. The method for controlling gear shifting of the hybrid electric vehicle according to claim 1, wherein the preset speed difference range is 200 rpm to 400 rpm.

11. An apparatus for controlling gear shifting of a hybrid electric vehicle, comprising:

a processor and a memory storing at least one computer program;

wherein the at least one computer program, when loaded and executed by the processor, causes the apparatus to perform:

determining, in response to a received vehicle state transmitted by a vehicle control unit (VCU) being a braking state or a sliding state, a first target torque value;

transmitting, once at an interval of a preset time period and via the VCU, a first torque control instruction to a first microcontroller unit (MCU) and a second torque control instruction to a second MCU based on the first target torque value, wherein the first torque control instruction comprises a torque control mode and a first torque value, the second torque control instruction comprises a torque control mode and a second torque value, and a sum of the first torque value and the second torque value transmitted each time is equal to the first target torque value;

transmitting, in response to a difference between a received rotational speed of an integrated starter generator (ISG) that is transmitted by the VCU and a received rotational speed of a clutch being within a preset speed difference range and via the VCU, a rotational speed control instruction to the first MCU and a gear shift instruction to the second MCU, wherein the rotational speed control instruction comprises a rotational speed control mode and a target rotational speed; and transmitting, in response to receiving a traction motor (TM) gear-shifting completion instruction transmitted by the VCU, once at an interval of the preset time period and via the VCU, a third torque control instruction to the first MCU and a fourth torque control instruction to the second MCU based on the first target torque value, wherein the third torque control instruction comprises a torque control mode and a third torque value, the fourth torque control instruction comprises a torque control mode and a fourth torque value, and a sum of the third torque value and the fourth torque value transmitted each time is equal to the first target torque value.

12. The apparatus for controlling gear shifting of the hybrid electric vehicle according to claim 11, wherein a difference between first torque values contained in two adjacent first torque control instructions transmitted to the first MCU via the VCU is a same as a difference between second torque values contained in corresponding second torque control instructions transmitted to the second MCU.

13. The apparatus for controlling gear shifting of the hybrid electric vehicle according to claim 11, wherein the at least one computer program, when loaded and executed by the processor, causes the apparatus to perform:

transmitting the first target torque value as the first torque value in the first torque control instruction transmitted to the first MCU via the VCU, and transmitting 0 as the second torque value in the second torque control instruction transmitted to the second MCU via the VCU.

14. The apparatus for controlling gear shifting of the hybrid electric vehicle according to claim 11, wherein the at least one computer program, when loaded and executed by the processor, causes the apparatus to perform:

transmitting 0 as the third torque value in the third torque control instruction transmitted to the first MCU via the VCU, and transmitting the first target torque value as the fourth torque value in the fourth torque control instruction transmitted to the second MCU via the VCU.

15. The apparatus for controlling gear shifting of the hybrid electric vehicle according to claim 11, wherein the at least one computer program, when loaded and executed by the processor, causes the apparatus to perform:

transmitting, via the VCU, a first pressure instruction to the clutch while transmitting, via the VCU, the first torque control instruction to the first MCU and the second torque control instruction to the second MCU, wherein the first pressure instruction comprises a first pressure value, a first pressure value in a current first pressure instruction being greater than a first pressure value in a previous first pressure instruction.

16. The apparatus for controlling gear shifting of the hybrid electric vehicle according to claim 11, wherein the at least one computer program, when loaded and executed by the processor, causes the apparatus to perform:

transmitting, via the VCU, a second pressure instruction to the clutch while transmitting, via the VCU, the rotational speed control instruction to the first MCU and the gear shift instruction to the second MCU, wherein the second pressure instruction comprises a second pressure value.

17. The apparatus for controlling gear shifting of the hybrid electric vehicle according to claim 16, wherein the at least one computer program, when loaded and executed by the processor, causes the apparatus to perform:

determining a second target torque value in a case that the difference between the received rotational speed of the ISG that is transmitted by the VCU and the received rotational speed of the clutch being within the preset speed difference range and in response to the received vehicle state transmitted by the VCU being an acceleration state;

transmitting, once at an interval of the preset time period and via the VCU, a fifth torque control instruction to the first MCU and the second pressure instruction to the clutch based on the second target torque value, wherein the fifth torque control instruction comprises a torque control mode and a fifth torque value, and along with an increase of a quantity of transmitting times, a value of the fifth torque value is first decreased and then increased; and transmitting, in response to a received torque value of the ISG that is transmitted by the VCU being the second target torque value, once at an interval of the preset time period, a fourth pressure instruction to the clutch, wherein the fourth pressure instruction comprises a fourth pressure value, a fourth pressure value in a current fourth pressure instruction being less than a fourth pressure value in a previous fourth pressure instruction.

18. The apparatus for controlling gear shifting of the hybrid electric vehicle according to claim 11, wherein the at least one computer program, when loaded and executed by the processor, causes the apparatus to perform:

transmitting, via the VCU, a third pressure instruction to the clutch while transmitting, via the VCU, the third torque control instruction to the first MCU and the fourth torque control instruction to the second MCU, wherein the third pressure instruction comprises a third pressure value, a third pressure value in a current third pressure instruction being less than a third pressure value in a previous third pressure instruction.

19. The apparatus for controlling gear shifting of the hybrid electric vehicle according to claim 11, wherein the rotational speed control mode is implemented by proportional-integral-derivative (PID) control; and the preset speed difference range is 200 rpm to 400 rpm.

20. A non-transitory computer-readable storage medium for controlling gear shifting of a hybrid electric vehicle including a transmission control unit (TCU) connected to a vehicle control unit (VCU), wherein the VCU is connected to a first microcontroller unit (MCU) of an integrated starter generator (ISG), a second MCU of a traction motor (TM), and a clutch, the non-transitory computer-readable storage medium storing at least one computer instruction, wherein the at least one computer instruction, when loaded and executed by a processor, causes the processor to perform:

determining, in response to a received vehicle state transmitted by the VCU being a braking state or a sliding state, a first target torque value;

transmitting, once at an interval of a preset time period and via the VCU, a first torque control instruction to the first MCU and a second torque control instruction to the second MCU based on the first target torque value, wherein the first torque control instruction comprises a torque control mode and a first torque value, the second torque control instruction comprises a torque control mode and a second torque value, and a sum of the first torque value and the second torque value transmitted each time is equal to the first target torque value;

transmitting, in response to a difference between a received rotational speed of the ISG that is transmitted by the VCU and a received rotational speed of the clutch being within a preset speed difference range and via the VCU, a rotational speed control instruction to the first MCU and a gear shift instruction to the second MCU, wherein the rotational speed control instruction comprises a rotational speed control mode and a target rotational speed; and transmitting, in response to receiving a TM gear-shifting completion instruction transmitted by the VCU, once at an interval of a preset time period and via the VCU, a third torque control instruction to the first MCU and a fourth torque control instruction to the second MCU based on the first target torque value, wherein the third torque control instruction comprises a torque control mode and a third torque value, the fourth torque control instruction comprises a torque control mode and a fourth torque value, and a sum of the third torque value and the fourth torque value transmitted each time is equal to the first target torque value.

* * * * *